US00H002137H

(19) United States

(12) Statutory Invention Registration

Newman et al.

(10) Reg. No.: US H2137 H

(43) Published: Jan. 3, 2006

(54) DOOR KNOB INSULATOR

(75) Inventors: George H. Newman, Niceville, FL (US); Audree D. Newman, Niceville, FL (US)

(73) Assignee: The United States of America as represented by the Secretary of the Air Force, Washington, DC (US)

(21) Appl. No.: 10/641,583

(22) Filed: Aug. 15, 2003

(65) Prior Publication Data

US 2005/0034270 A1 Feb. 17, 2005

(51) Int. Cl.
*A47B 95/02* (2006.01)

(52) U.S. Cl. ..... 16/110.1

(58) Field of Classification Search ..... 16/110.1, 16/414, 422, 441, 904; 292/347, 348, 349; 70/232, 168; 473/300–303, 549, 551; 15/208, 15/244.4, 230.15; D8/310, 322, 402
See application file for complete search history.

(56) References Cited

U.S. PATENT DOCUMENTS

| | | | | | |
|---|---|---|---|---|---|
| 1,491,780 | A | * | 4/1924 | Abbott | 292/347 |
| 2,753,911 | A | * | 7/1956 | Haslett | 16/86 A |
| 2,781,220 | A | * | 2/1957 | Zietlow | 292/347 |
| 3,343,578 | A | * | 9/1967 | Rubin | 150/155 |
| D299,904 | S | * | 2/1989 | Smith | D7/393 |
| 4,832,942 | A | * | 5/1989 | Crace | 428/41.1 |
| 4,856,140 | A | * | 8/1989 | Visco et al. | 16/412 |
| 5,008,551 | A | * | 4/1991 | Randolph | 250/462.1 |
| D317,397 | S | * | 6/1991 | Guberman | D8/322 |
| 5,713,615 | A | * | 2/1998 | Tsai | 292/347 |
| 5,840,122 | A | * | 11/1998 | Williams | 118/505 |
| D427,046 | S | * | 6/2000 | Mannix | D8/322 |
| 6,546,594 | B1 | * | 4/2003 | Wills | 16/422 |

FOREIGN PATENT DOCUMENTS

| | | | |
|---|---|---|---|
| JP | 09324366 | A | * 12/1997 |
| JP | 11062331 | A | * 3/1999 |
| JP | 11350804 | A | * 12/1999 |
| JP | 2000234249 | A | * 8/2000 |
| JP | 2003097101 | A | * 4/2003 |

* cited by examiner

*Primary Examiner*—M. Thomson
(74) *Attorney, Agent, or Firm*—William G. Auton

(57) ABSTRACT

An insulated elastic cover that slips snuggly over interior or exterior door knob. It is constructed in a manner that allows locking and unlocking actions, as well as the ability to turn the door knob. Invention takes advantage of state-of-the-art materials to maximize insulating properties while minimizing bulk. Additionally, material is impregnated with anti-bacteriological medium that destroys hand-borne bacteria transferred from hand to door knob.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DOOR KNOB INSULATOR

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to insulation and more specifically to a themnal door knob insulator.

Door knobs are generally made of metal and many are constructed of brass—an outstanding energy radiating material. Substantial measures are generally taken to insulate heated/cooled home and offices, but the door knob has been overlooked as a major energy leaker. Significant home/office heating and cooling is lost to the environment through radiation from these small radiators. This invention provides the means to stop the loss of home/office heating/cooling through the door knob, while providing some protection from bacteria contamination common to most door knobs.

A need has been recognized for conserving heating and cooling through a use of thermal insulation, but solutions for these needs are just in their infancy. Solutions we have seen have included storm windows, and thermal insulation added to roofs and the interior of walls. But what about the largest single aperture of any home, the door? While the door structure may be replaced, conventional knobs and keyholes are thermal conductors, a problem that needs to be solved.

SUMMARY OF THE INVENTION

The present invention is a stretchable, thermally insulated knob cover fits over a door knob and further has a flange-like expanded fringe to cover a keyhole. The cloth can be a stretchable insulator cloth with an adhesive substance on its interior surface and an anti-bacteriological substance on its surface, as discussed below.

DETAILED DESCRIPTION OF THE PREFERRED EMBODIMENT

In one embodiment, the present invention is an insulated elastic cover that slips snugly over interior or exterior door knob. It is constructed in a manner that allows locking and unlocking actions, as well as the ability to turn the door knob. Invention takes advantage of state-of-the-art materials to maximize insulating properties while minimizing bulk. Additionally, material is impregnated with anti-bacteriological medium that destroys hard-borne bacteria transferred from hand to door knob.

Figure 1:
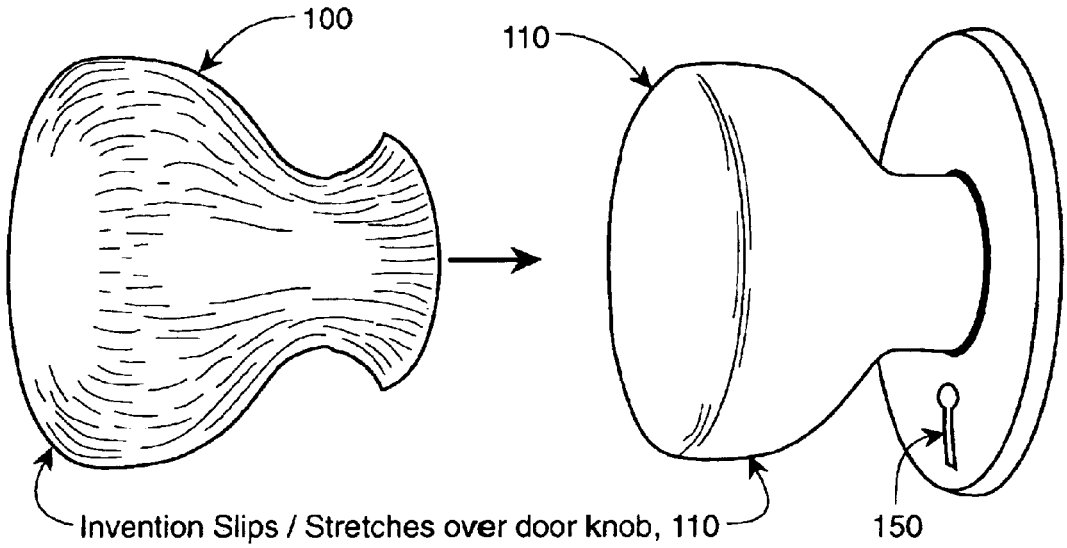
FIGS. 1 and 2 show 2 embodiments of the present invention.

FIG. 1 is an illustration of an embodiment of the preferred invention. In FIG. 1, a streachable, thermally insulated knob cover 100 fits over a door knob, 110 and further has a flange-like expanded fringe to cover a keyhole 150. The cloth can be a stretchable insulator cloth with an adhesive substance on its interior surface and an anti-bacteriological substance on its surface, as discussed below.

One key to the success of the invention is the use of a suitable insulator cloth, such as that disclosed in the following U.S. Patents, the disclosures of which are incorporated herein by reference:

U.S. Pat. No. 4,486,492, Dec. 4, 1984, Insulated cloth for industrial And civil covering applications, Ziliotto, Alberto, and U.S. Pat. No. 3,589,971, Jun. 29, 1971, Insulating Jackets for Instruments Comprising a layer of asbestos cloth, a layer of cotton drill Fabric a layer of glass fiber insulation and a layer of Neoprene coated aluminized nylon.

These fabrics can become bacteriological insulators by coating them with anti-bacteriological agents such as alcohol, tetraclines, and any anti-viral chemicals. Suitable agents include methyl paraben, ethyl paraben, propyl paraben.

Figure 2:
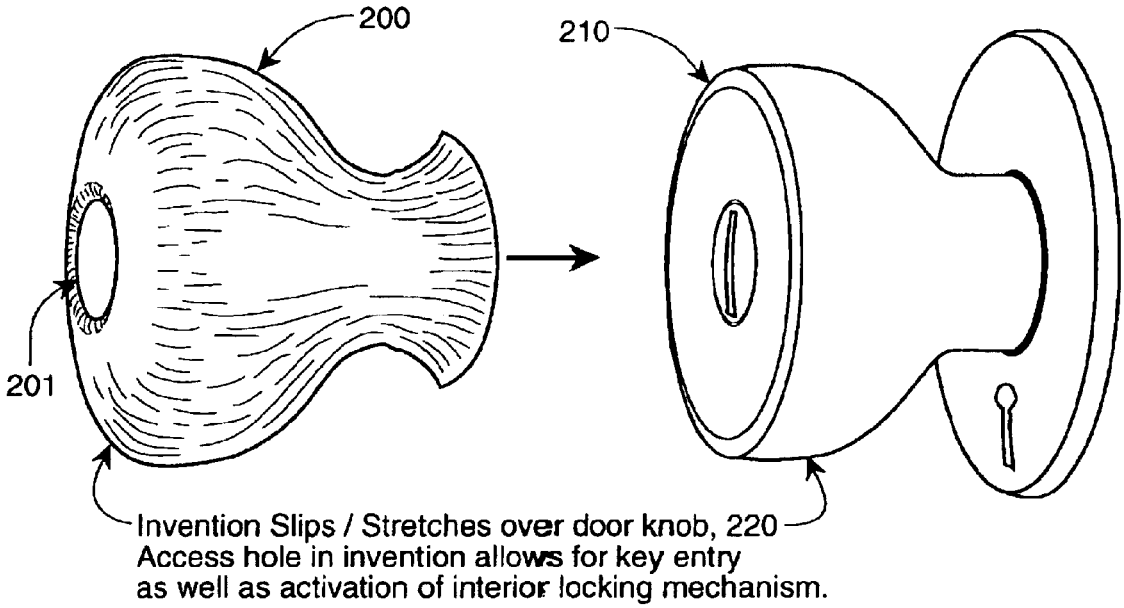

FIG. 2 is another embodiment of the present invention. In FIG. 2 the insulator cover 200 has a foot section that fits over the Knob 220 and a top aperture 201 that permits a key insulator when the key opening is in the Knob 220.

As mentioned above, the cover is a stretchable cloth with a silhouette and shape that fits snugly over a door knob. It may rely on friction to keep it in place, or have a mild adhesive on its interior surface.

While the invention has been described in its presently preferred embodiment it is understood that the words, which have been used, are words of description rather than words of limitation and that changes within the purview of the appended claims may be made without departing from the scope and spirit of the invention in its broader aspects.

What is claimed is:

1. A stretchable, thermally insulated knob cover that fits over a door knob and which comprises a fitted door knob cover constructed from thermally insulated cloth.

2. A knob cover, as defined in claim 1, which is an exterior surface coated with anti-bacteriological agents selected from an group consisting of:

alcohol, tetracycalines, methyl paraben, ethyl paraben, propyl paraben and butyl paraben.

3. A knob cover, as defined in claim 1, wherein said door knob has a key hole below the knob and wherein said knob cover has a silhouette and shape that covers the door knob, and said knob cover has a flanged and spread opening that covers the keyhole when the knob cover is on the door knob.

4. A knob cover, as defined in claim 1, wherein the door knob has a center and a key hole in its center and wherein the knob cover as a center keyhole aperture that fits over the keyhole of the door knob.

5. A knob cover, as defined in claim 2, wherein the door knob has a center and a keyhole in its center and wherein the knob cover as a center keyhole aperture that fits over the keyhole of the door knob.

6. A knob cover, as defined in claim 2, wherein said door knob has a key hole below the knob and wherein said knob cover has a silhouette and shape that covers the door knob, and said knob cover has a flanged and spread opening that covers the keyhole when the knob cover is on the door knob.

* * * * *